Figure 1:
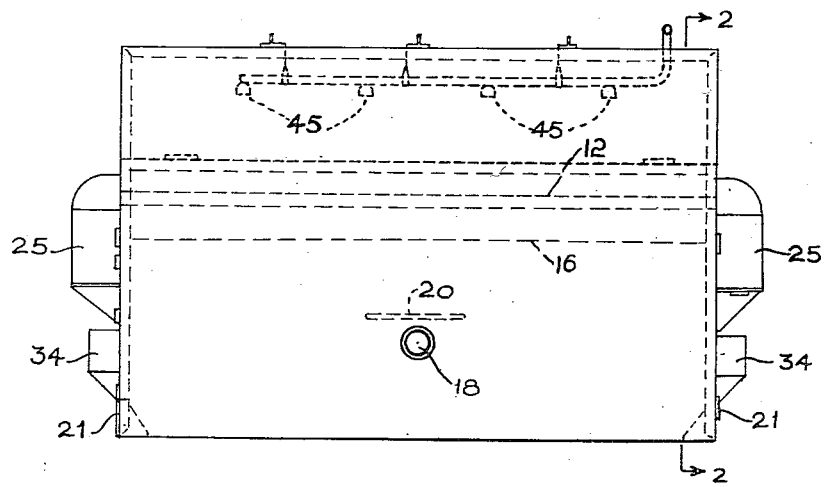

Nov. 27, 1956    G. R. UNTHANK    2,771,997
APPARATUS FOR SEPARATING WATER, OIL, SLUDGES, WAXES, AND THE LIKE
Filed June 23, 1952    4 Sheets-Sheet 1

Inventor
George R. Unthank
By Ralph B. Stewart
attorney

Nov. 27, 1956  G. R. UNTHANK  2,771,997
APPARATUS FOR SEPARATING WATER, OIL, SLUDGES, WAXES, AND THE LIKE
Filed June 23, 1952  4 Sheets-Sheet 2

Inventor
George R. Unthank
By Ralph B. Stewart
attorney

Nov. 27, 1956   G. R. UNTHANK   2,771,997
APPARATUS FOR SEPARATING WATER, OIL, SLUDGES, WAXES, AND THE LIKE
Filed June 23, 1952   4 Sheets-Sheet 3

Inventor
George R. Unthank
By
Ralph B. Stewart
Attorney

# United States Patent Office 2,771,997
Patented Nov. 27, 1956

2,771,997

APPARATUS FOR SEPARATING WATER, OIL, SLUDGES, WAXES, AND THE LIKE

George Rodham Unthank, London, England, assignor of one-half to Henry Arthur John Silley, London, England Application June 23, 1952, Serial No. 295,095

Claims priority, application Great Britain July 6, 1951

5 Claims. (Cl. 210—60)

This invention relates to apparatus for separating water, oil, sludges, waxes and the like and relates especially, but not exclusively, to apparatus for separating relatively small quantities of oil sludges, waxes and the like from large quantities of water.

It is usual, when water-borne vessels such as sea-going oil-tankers are proceeding with less than full load, to take aboard sufficient water ballast to ensure stability during the passage. Before the vessel can be fully loaded with cargo or unloaded, the water ballast must be unloaded, but this is now contaminated with the cargo or the residues thereof in the cargo hold, and it is therefore necessary to ensure adequate separation and retention of these impurities before the water ballast is unloaded overboard in confined waters.

To permit rapid unloading of the water ballast the separator installation must be of relatively large flow capacity (e. g. 500 tons per hour and upwards), and in such large installations it is preferable to use several separators of smaller capacity connected in parallel. Obviously, very powerful pumps are required to move such large quantities of liquid rapidly and it is often found that there is a long pipe-run from the pumps to the separation apparatus, which is usually located on shore. As a result there is a tendency for relatively large surges to build up in the pipe and the separator and this is a disadvantage since, for proper separation, it is essential that the flow through the separators should be as free from surges as possible.

A principal object of the present invention is therefore the provision of means for controlling the flow of the liquid to the separator or separators in such manner as to prevent surges. Such means are preferably also effective to ensure that if the separation is found to be inadequate and the pumps are stopped the flow through the separator or separators will cease almost at once and the quantity of contaminated liquid discharged from the installation will thus be small. Preferably, the flow in all the separators of such an apparatus can be controlled simultaneously.

Since some oil residues contain relatively large quantities of sludges and waxes, the waxes having specific gravities which may vary over a range between limits which are higher and lower than that of the contaminated ballast water, it is desirable that these sludges and waxes should be separated from the liquid before it passes to the separators.

A further object of this invention is to provide an apparatus as described in which the separation of sludges and waxes can be effected before delivery of the contaminated liquid to separators for oil and water.

Another object is to provide such an apparatus in which means for the separation of sludges and waxes also serves to prevent or reduce the effect of surges in the contaminated liquid delivered to the installation from being transmitted to the contaminated liquid delivered to separators for oil and water.

According to this invention an installation for the separation of water, oil, sludges, waxes and the like includes means for controlling the flow of contaminated water to one or more water-oil separators and for effecting an initial separation of sludges and waxes, comprising a chamber divided into first and second portions by a weir extending across the chamber, an inlet for contaminated water arranged in the first portion of the chamber and positioned below the level of the upper edge of the weir and an outlet to the separator or separators respectively arranged in the second portion of the chamber and positioned at or about the level of the upper edge of the weir. A first baffle is arranged in the second portion of the chamber extending downwardly and across the chamber adjacent the weir, the level of the lower edge of the baffle being somewhat below the level of the upper edge of the weir and the outlet is separated from the main part of the second portion of the chamber by a second baffle which extends downwardly and across the chamber with its lower edge adjacent the floor thereof. A horizontal baffle plate may be provided in the first portion of the chamber above the inlet to prevent incoming contaminated water flowing directly over the weir.

Hand holes or the like may be provided in the lower parts of the chamber walls for the removal of accumulated sludge and the heavier waxes while means may also be provided for the removal of oil and the lighter waxes floating on the surface of the water in the chamber.

Figure 2:
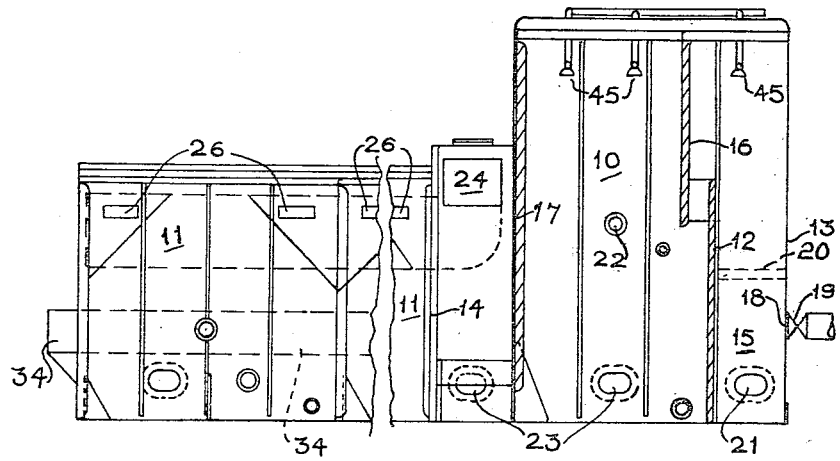
Figure 3:
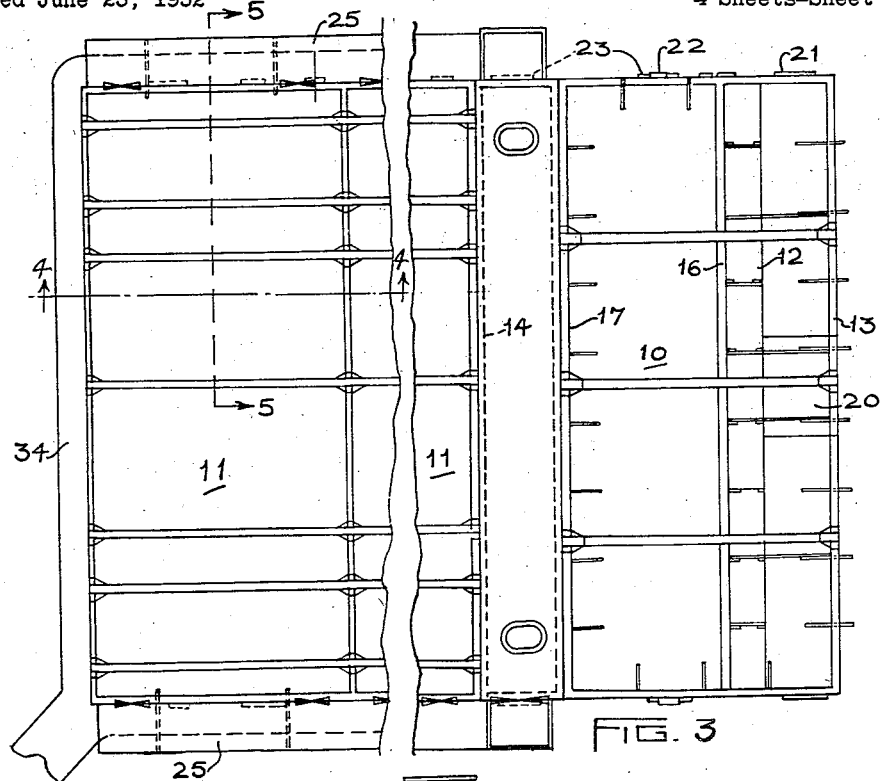
Figure 4:
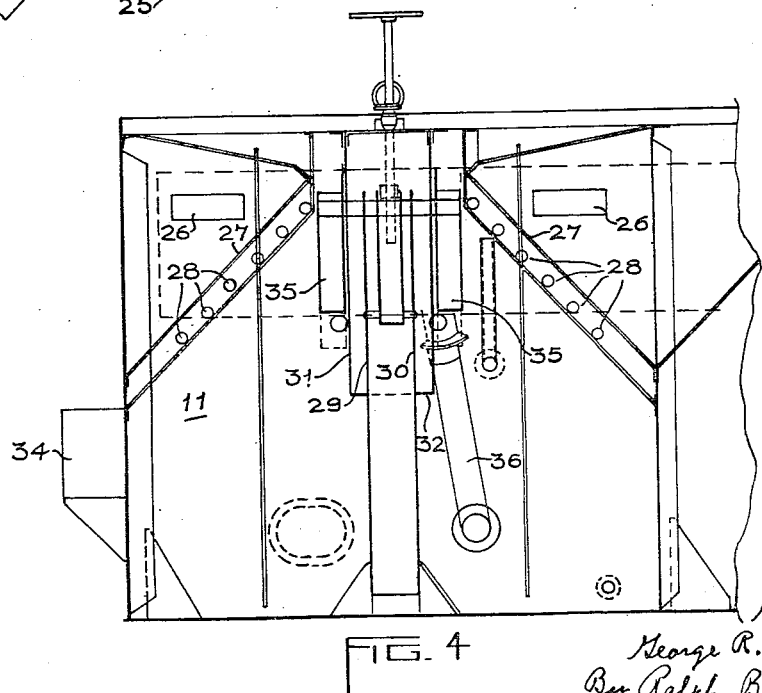
Figure 5:
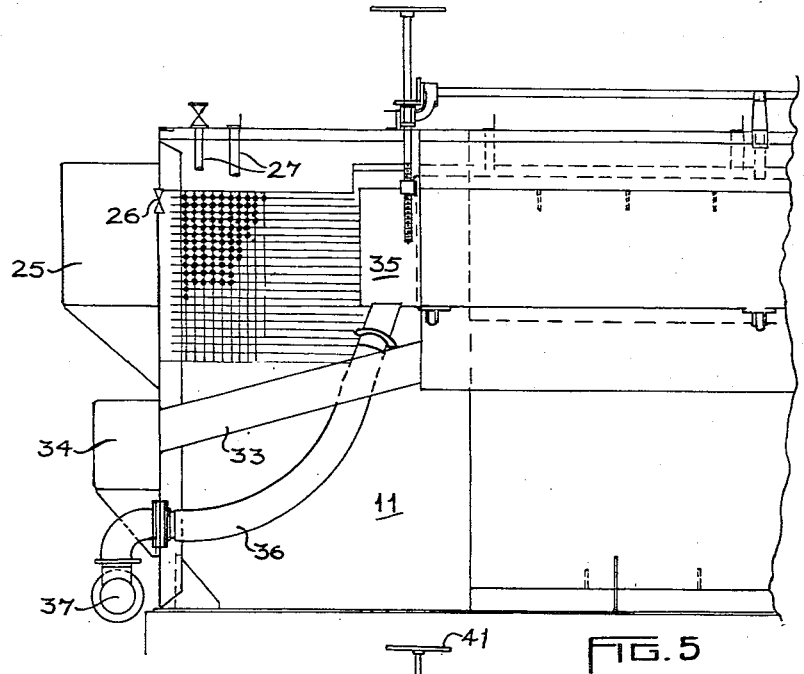
Figure 6:
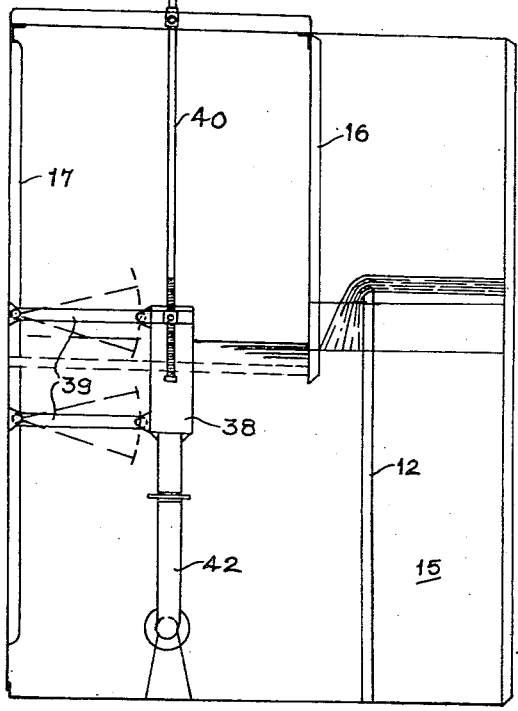
Figure 7:
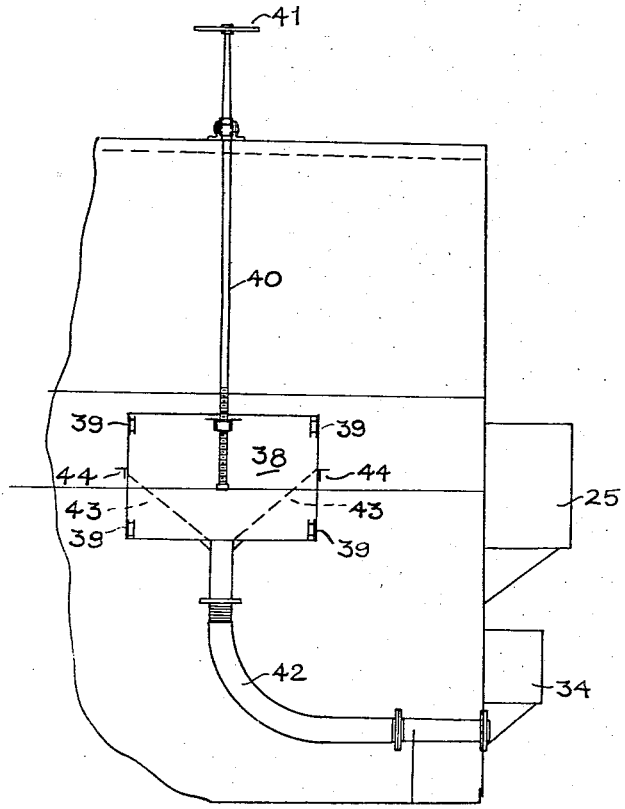

An installation embodying the invention, and capable of handling conveniently up to 1,000 tons of contaminated water per hour, will now be described, by way of example with reference to the accompanying drawings in which Figures 1, 2 and 3 are respectively an end view, a part longitudinal section on the line 2—2 of Figure 1 and a part plan, Figure 4 is a section on the line 4—4 of Figure 3, Figure 5 is a part section on the line 5—5 of Figure 3, and Figures 6 and 7 show respectively a side and an end view of a modification of part of the installation of Figures 1–5.

In the following description the dimensions of certain parts of the particular installation described are given only in order that the nature and proportions of the installation may be more clearly understood.

The installation shown in Figures 1–3 comprises a flow control chamber 10 into which contaminated water is fed for the separation of sludge and wax, and a plurality of separating chambers 11, for example five, which are fed in parallel with contaminated water from the chamber 10.

The flow control and sludge- and wax-separation chamber 10 is rectangular in plan and elevation, being 25 feet wide, 15 feet long and 16 feet in height. A weir 12 is 25 feet wide and 10 feet high and extends the full width of the first chamber 10, comprising a plate which projects vertically upwards from the chamber floor to divide the chamber into a first portion and a second portion. The weir 12 is parallel to and spaced 3 feet from a first one 13 of the two end walls 13, 14 of the chamber 10, forming in the first portion of the chamber a sludge deposition compartment 15 between itself and the end wall 13. A baffle 16 is 25 feet wide and 8¼ feet high and is disposed in the second portion of the chamber, the baffle extending the full width of the chamber and comprising a plate which projects vertically downwards from the top of the chamber, being parallel to and spaced 4½ feet from the end wall 13. A further baffle 17 is arranged in the second portion of the chamber some 3½ feet from the end wall 14 and extending downwards so that its lower edge is spaced 15 inches from the floor of this part of the chamber.

A 12 inch diameter delivery port 18 for contaminated water is provided in the end wall 13, its axis being spaced equi-distantly from the two side walls of the chamber and 4 feet from the chamber floor. Liquid is delivered to the port through a controllable delivery valve 19 hereinafter called the main delivery valve. A horizontal deflector plate 20 is 3 feet long and 4 feet wide and is disposed above the delivery port 18, the plate extending the full length of the sludge deposition compartment 15 formed between the weir 12 and the end wall 13. Thus, liquid entering the chamber 10 through the delivery port 18 cannot pass directly over the weir 12 but is turned in a direction towards one or other of the two side walls. The presence of the baffle plate 20 adjacent the weir plate 12 gives rise to two effects. Firstly, turbulence of the liquid passing over the weir 12 caused by liquid entering the chamber is reduced by the plate 20 and, secondly, the weir plate 16 causes a sudden change of direction of flow of the liquid on entering the compartment 15 of the chamber, which change in flow tends to throw sludge and the heavier waxes carried by the liquid to the bottom of this sludge separation compartment; a handhole 21 for the removal of the sludge is provided at the bottom of the compartment.

The liquid passes over the weir 12 and is deflected downwards by the baffle 16, the liquid moving downwards and along the second portion of the chamber 10 until it passes under the baffle 17 when it begins to move upwards on the opposite side of baffle 17. During its comparatively long travel downwards into and lengthwise of the second portion of the chamber 10, oils and waxes of lower specific gravity than that of the liquid are able to separate from the liquid, moving upwards until they enter the space formed between the baffles 16 and 17. The deflection imparted by the first baffle 16, to the liquid which has passed over the weir ensures that no substantial turbulence is produced in the said second portion, even if surges occur in the delivered contaiminated liquid. A 4 inch diameter exit port 22 is provided for oil which separates from the liquid and enters the space between the baffles, the axis of this port being 3 inches above the level of the bottom edge of the baffle 16. Most of the separated waxes float to the top of the oil and can be ladled off, the top of the chamber being completely open. Some of the waxes which are of higher specific gravity than the liquid and which have been carried over the weir settle to the bottom of the second portion of the chamber 10 during the said comparatively long travel. Handholes 23 are provided near to the bottom of this portion of the chamber to enable the various deposits to be removed at intervals. Test and drain cocks are also provided.

It is sometimes found that evil-smelling gases are given off by the liquid passing through the chamber 10, and this is especially the case when the liquid has been heated to increase the fluidity of the oil. To prevent escape of these gases to the surrounding atmosphere spray nozzles 45 (Figs. 1 and 2) supplied with water under high pressure are disposed at the top of the chamber 10 and produce a fine spray or mist of water, e.g. sea water, in the space above the oil level. Preferably, the nozzles are of the type which are said to "atomise" the liquid, e. g. so that the droplets produced by the nozzles are of the same order of magnitude as the droplets in a natural mist, since it is found that the spray or mist produced by such nozzles is most effective in preventing escape of the gases. The amount of water which is thus supplied to the chamber is inconsiderable compared with the amount of water normally passing through the installation.

Near the top of the second portion of the chamber and between the end wall 14 and the baffle 17 are provided two oily-water discharge ports 24 (one in each side wall) communicating with two conduits 25 leading to the oily-water delivery ports 26 of the parallel connected separators 11. Each of the two oily-water discharge ports 24 is rectangular in section and is 2 feet high and 2½ feet long, the lower edges of the ports being level with the top edges of the delivery ports 26 of the separators (these delivery ports also being rectangular), 15 inches lower than the top edge of the weir 12 and 12 inches higher than the lower edge of the baffle 16.

In use the level of the liquid passing over the weir 12 is not much higher than the top edge of the weir and thus flow ceases very soon after the main delivery valve 19 is closed. Thereafter, as soon as the liquid level in the chamber 10 has fallen to the level of the lower edges of the oily-water discharge ports 24 the flow through the separators ceases. A head of about 6 inches is required to maintain the flow through the five separators connected in parallel, the extra height (about 9 inches) of the weir above this level being desirable to enable the weir to reduce the transmission to the separators of the effect of surges in the liquid. Since the separators are supplied from the common conduit 25 connecting them with the discharge ports 24, the rate of flow of liquid in them can be controlled simultaneously and rapidly by operation of the main delivery valve 19.

The separators may conveniently be of a type which is open to atmosphere, such as that described in United Kingdom patent specification No. 243,433, or of a type which is totally enclosed, such as that described in United Kingdom patent specification No. 474,940. As shown, they are each 25 feet wide, 11 feet long and 10 feet high. A separator of this type and of such dimensions has a maximum flow capacity of about 300 tons per hour.

The construction of the separators of the present installation may best be seen from Figures 4 and 5 which show a longitudinal and a half transverse section respectively. The oily-water which flows through the conduits 25 extending down both sides of the installation enters the separator through the ports 26 and flows downwards through perforated distributing plates 27 and over a heating coil 28. Thereafter, the liquid moves downward until it passes under the lower edges of parallel plates 29 and 30 and then passes upwards in the space between the said two plates. Separated water flows from the chamber through the space between parallel plates 31, 29 and 30, 32, the upper edges of the plates 29, 30 forming a weir, and then through the pipe 33 (Fig. 5) to water discharge conduits 34 which extend along both sides of the installation. Separated oil flows over the upper edge of an adjustable oil box 35 which is connected through a flexible pipe 36 with main oil discharge conduits 37 (Fig. 5).

Figures 6 and 7 illustrate an additional feature that may be provided in the installation shown in Figures 1–5. An oil box 38 may be provided in the chamber 10 between the baffles 16, 17 to enable the removal of bulk oil in this portion of the chamber either when the system is in operation or when the flow of liquid has been stopped. The oil box is held perpendicular by means of four parallel links 39 which are pivotally connected between the box and the baffle 17 while it is supported from a screwed rod 40 provided at its upper end with a handwheel 41, so that the position of the upper edge of the box relative to the liquid level may be adjusted. The bottom of the box is connected through a flexible pipe 42 with the main oil discharge conduit while the weight of the box, the links and the pipe is so adjusted, for example by means of fillets 43 of cement or other suitable material, that the buoyancy of the box is almost completely destroyed, thus permitting very fine adjustment of the height of the box to be made easily. The box 38 is conveniently located by guides 44 of angle-iron which extend between the baffles 16 and 17. Conveniently two such oil boxes are provided in the chamber 10 one on each side of the central longitudinal axis.

I claim:

1. Apparatus for effecting initial separation of waxes and sludge from oil-contaminated water, comprising a chamber having a floor, end walls and side walls, a weir plate extending vertically upwardly from the floor across the chamber between the side walls and adjacent one end wall of said chamber, an inlet conduit opening into said chamber through the said one end wall at a point above said floor and below the upper edge of said weir plate, said conduit directing a concentrated stream of contaminated liquid horizontally against said vertical weir plate to produce an abrupt change in direction of flow of said liquid in said chamber, a baffle plate extending downwardly across the chamber between the side walls thereof and on the opposite side of said weir plate from said inlet conduit, said baffle plate having its lower edge arranged at a level below the level of the upper edge of said weir plate, and a horizontal baffle plate extending between said one end wall and said weir plate above said inlet conduit but below the edge of said weir plate and having its side edges spaced from said side walls.

2. Apparatus according to claim 1 and including an outlet for removing oil and waxes floating on the surface of the water in said second portion between said baffles comprising a conduit having its inlet mounted for vertical adjustment within said second portion of said chamber.

3. Apparatus for effecting initial separation of waxes and sludge from oil-contaminated water comprising a chamber having a floor, end walls and side walls, a weir plate extending upwardly from the floor and across the chamber between the side walls, an inlet for contaminated liquid arranged in one end wall below the level of said weir, a horizontal baffle plate arranged between said one end wall and said weir plate and above said inlet but below the edge of said weir plate and having its side edges spaced from said side walls, a first baffle extending downwardly across the chamber between the side walls and adjacent the weir on the side remote from the inlet, said first baffle having a lower edge arranged at a level below the level of said weir, a second baffle extending downwardly across the chamber between the side walls and adjacent the other end wall, said second baffle having a lower edge arranged adjacent the floor of the chamber, and an outlet for contaminated liquid arranged between said other end wall and said second baffle at substantially the level of said weir.

4. Apparatus for effecting initial separation of waxes and sludge from oil-contaminated water comprising a chamber, a weir extending across the chamber and dividing it into first and second portions, an inlet for contaminated liquid in said first portion, said inlet being positioned below the level of the upper edge of said weir, a first baffle extending downwardly and across said second portion of the chamber adjacent said weir with its lower edge below the level of said weir, a second baffle extending downwardly and across said second portion of the chamber remote from said weir with its lower edge below the level of said weir, an outlet for contaminated liquid arranged in said second portion of said chamber on the side of the said second baffle remote from the said weir and means including spray nozzles located in the chamber above the level of the upper edge of the weir for producing in the chamber above the oil level a spray of water preventing, at least in part, escape of gases from the chamber.

5. Apparatus for effecting initial separation of waxes and sludge from oil-contaminated water comprising a chamber, a weir extending across the chamber dividing it into a first and a second portion, an inlet for contaminated liquid in said first portion and arranged below the level of said weir, a first baffle extending downwardly across said chamber adjacent said weir with its lower edge below the level of said weir, a second baffle extending downwardly across said chamber remote from said weir with its lower edge below the level of said weir, an outlet communicating with the water oil separator arranged in the second portion of the chamber and on that side of said second baffle remote from said weir, said outlet being positioned at about the level of said weir, and means for removing oil floating on the water in said second portion of the chamber and between the first and the second baffles comprising an open-topped box, adjustable support means for positioning said box with its upper edge at or below the surface of the oil, and a flexible conduit extending from said box out of said chamber for removing oil flowing into said box.

References Cited in the file of this patent

UNITED STATES PATENTS

| | | |
|---|---|---|
| 748,981 | Oliver | Jan. 5, 1904 |
| 1,116,903 | McClintock | Nov. 10, 1914 |
| 1,450,545 | Hans | Apr. 3, 1923 |
| 1,490,794 | Alexander | Apr. 15, 1924 |
| 1,636,815 | Green et al. | July 26, 1927 |
| 1,663,651 | Green | Mar. 27, 1928 |
| 1,672,583 | Travers | June 5, 1928 |
| 2,031,437 | Vincent | Feb. 18, 1936 |
| 2,229,610 | Nicholoy | Jan. 21, 1941 |
| 2,342,950 | Lovelady et al. | Feb. 29, 1944 |
| 2,361,577 | Unthank et al. | Oct. 31, 1944 |
| 2,661,094 | Stewart | Dec. 1, 1953 |